US012599987B2

(12) United States Patent
Yamagishi et al.

(10) Patent No.: US 12,599,987 B2
(45) Date of Patent: Apr. 14, 2026

(54) FRICTION STIR SPOT WELDED JOINT AND PRODUCTION METHOD THEREFOR, AND FRICTION STIR SPOT WELDING METHOD

(71) Applicant: JFE STEEL CORPORATION, Tokyo (JP)

(72) Inventors: Daiki Yamagishi, Tokyo (JP); Katsutoshi Takashima, Tokyo (JP); Hiroshi Matsuda, Tokyo (JP); Ryoji Ohashi, Kobe (JP); Yoshitaka Muramatsu, Kobe (JP); Takuya Fukuda, Kobe (JP)

(73) Assignee: JFE STEEL CORPORATION, Tokyo (JP)

( * ) Notice: Subject to any disclaimer, the term of this patent is extended or adjusted under 35 U.S.C. 154(b) by 98 days.

(21) Appl. No.: 18/683,510

(22) PCT Filed: Jul. 21, 2022

(86) PCT No.: PCT/JP2022/028410
§ 371 (c)(1),
(2) Date: Feb. 14, 2024

(87) PCT Pub. No.: WO2023/032514
PCT Pub. Date: Mar. 9, 2023

(65) Prior Publication Data
US 2024/0351133 A1      Oct. 24, 2024

(30) Foreign Application Priority Data

Aug. 31, 2021     (JP) ................................. 2021-141899

(51) Int. Cl.
*B23K 20/00* (2006.01)
*B23K 20/12* (2006.01)
(Continued)

(52) U.S. Cl.
CPC .......... *B23K 20/12* (2013.01); *B23K 2101/18* (2018.08); *B23K 2101/34* (2018.08); *B23K 2103/04* (2018.08)

(58) Field of Classification Search
CPC .............. B23K 2103/04; B23K 20/122; B23K 2101/18; B23K 2103/05; B23K 20/22;
(Continued)

(56) References Cited

U.S. PATENT DOCUMENTS 7,290,695 B2 * 11/2007 Koga ................. B23K 20/1245
                                                                  228/2.1
7,802,713 B2 * 9/2010 Fukuhara ............. B23K 20/125
                                                                  228/2.1
(Continued)

FOREIGN PATENT DOCUMENTS

JP        2003245782 A      9/2003
JP        2008255369 A      10/2008
(Continued)

OTHER PUBLICATIONS

Oct. 11, 2022, International Search Report issued in the International Patent Application No. PCT/JP2022/028410.
(Continued)

*Primary Examiner* — Erin B Saad
(74) *Attorney, Agent, or Firm* — KENJA IP LAW PC

(57) ABSTRACT

Provided is a friction stir spot welded joint having high joint strength even in the case where a high strength steel sheet, particularly a steel sheet with a tensile strength (TS) of 980 MPa or more, is used as a material to be welded. An annular groove is formed on an upper surface of an upper sheet out of overlapping steel sheets, and a shape, microstructure, and hardness of a welded portion are appropriately controlled simultaneously.

18 Claims, 2 Drawing Sheets

(51) Int. Cl.
*B23K 101/18* (2006.01)
*B23K 101/34* (2006.01)
*B23K 103/04* (2006.01)

(58) Field of Classification Search
CPC .. B23K 2103/24; B29C 66/1122; B29C 66/21
See application file for complete search history.

(56) References Cited

U.S. PATENT DOCUMENTS

| | | | | |
|---|---|---|---|---|
| 11,534,981 B2* | 12/2022 | Okada | | B29C 66/41 |
| 11,633,802 B2* | 4/2023 | Okada | | B23K 20/1245 |
| | | | | 228/112.1 |
| 11,839,929 B2* | 12/2023 | Sekiguchi | | B23K 20/125 |
| 11,858,060 B2* | 1/2024 | Hatano | | B23K 20/1245 |
| 11,911,841 B2* | 2/2024 | Miyake | | B23K 20/125 |
| 12,202,066 B2* | 1/2025 | Muramatsu | | B23K 20/126 |
| 12,303,995 B2* | 5/2025 | Takeoka | | B23K 20/1265 |
| 12,365,046 B2* | 7/2025 | Konno | | B23K 20/125 |
| 12,370,621 B2* | 7/2025 | Miyake | | B23K 20/123 |
| 12,391,005 B2* | 8/2025 | Hatano | | B29C 65/0681 |
| 2006/0169740 A1* | 8/2006 | Fukuhara | | B23K 20/1265 |
| | | | | 228/2.1 |
| 2008/0023524 A1* | 1/2008 | Ohashi | | B23K 20/125 |
| | | | | 228/2.1 |
| 2009/0140026 A1* | 6/2009 | Okauchi | | B23K 20/123 |
| | | | | 228/2.1 |
| 2010/0178526 A1 | 7/2010 | Fujii et al. | | |
| 2014/0069985 A1* | 3/2014 | Okada | | B23K 20/1245 |
| | | | | 228/2.1 |
| 2014/0069986 A1* | 3/2014 | Okada | | B23K 20/125 |
| | | | | 228/2.1 |
| 2015/0183053 A1* | 7/2015 | Kumagai | | B23K 20/1265 |
| | | | | 228/112.1 |
| 2015/0183054 A1* | 7/2015 | Okada | | B23K 20/1255 |
| | | | | 228/2.1 |
| 2016/0318120 A1* | 11/2016 | Okada | | B23K 20/126 |
| 2017/0151625 A1 | 6/2017 | Utsumi et al. | | |
| 2017/0304935 A1* | 10/2017 | Okada | | B23K 20/22 |
| 2017/0341176 A1* | 11/2017 | Okada | | B23K 20/125 |
| 2018/0257169 A1* | 9/2018 | Okada | | B23K 20/129 |
| 2018/0297145 A1* | 10/2018 | Ohashi | | B23K 20/12 |
| 2018/0304401 A1* | 10/2018 | Ohashi | | B23K 20/125 |
| 2019/0070692 A1* | 3/2019 | Haruna | | B23K 20/123 |
| 2019/0143442 A1* | 5/2019 | Ohashi | | B23K 11/16 |
| | | | | 428/172 |
| 2019/0193167 A1* | 6/2019 | Horiuchi | | B25J 11/005 |
| 2019/0262934 A1* | 8/2019 | Ohashi | | B23K 20/12 |
| 2019/0314927 A1* | 10/2019 | Ohashi | | B23K 20/1235 |
| 2020/0206838 A1* | 7/2020 | Hirano | | B23K 20/1265 |
| 2020/0206839 A1* | 7/2020 | Hirano | | B23K 20/126 |
| 2020/0206840 A1* | 7/2020 | Hirano | | B23K 20/123 |
| 2020/0206937 A1* | 7/2020 | Otsuki | | B25J 9/10 |
| 2020/0276666 A1* | 9/2020 | Haruna | | B23K 20/1245 |
| 2020/0282491 A1* | 9/2020 | Haruna | | B23K 20/1265 |
| 2021/0086291 A1* | 3/2021 | Okada | | B23K 20/125 |
| 2021/0205918 A1 | 7/2021 | Fujii et al. | | |
| 2021/0331421 A1* | 10/2021 | Okada | | B29C 66/8322 |
| 2022/0072653 A1* | 3/2022 | Hatano | | B23K 20/126 |
| 2022/0105589 A1* | 4/2022 | Sekiguchi | | B23K 20/125 |
| 2022/0143739 A1* | 5/2022 | Hatano | | B23K 20/1255 |
| 2022/0145435 A1 | 5/2022 | Fujii et al. | | |
| 2022/0339734 A1* | 10/2022 | Miyake | | B23K 20/125 |
| 2023/0191710 A1* | 6/2023 | Hatano | | B29C 65/0681 |
| | | | | 264/68 |
| 2023/0211434 A1* | 7/2023 | Muramatsu | | B23K 20/1265 |
| | | | | 228/2.1 |
| 2023/0241708 A1* | 8/2023 | Hatano | | B23K 20/1255 |
| | | | | 228/2.1 |
| 2023/0249281 A1* | 8/2023 | Konno | | B23K 20/123 |
| | | | | 228/112.1 |
| 2023/0390860 A1* | 12/2023 | Takeoka | | B23K 20/227 |
| 2024/0207968 A1* | 6/2024 | Fukuda | | B23K 20/1265 |
| 2024/0293889 A1* | 9/2024 | Miyake | | B23K 20/125 |
| 2024/0316873 A1* | 9/2024 | Haruna | | F16B 5/04 |
| 2024/0351133 A1* | 10/2024 | Yamagishi | | C22C 38/002 |
| 2025/0065438 A1* | 2/2025 | Yamagishi | | B32B 7/05 |
| 2025/0100071 A1* | 3/2025 | Muramatsu | | B23K 20/125 |
| 2025/0144740 A1* | 5/2025 | Takeoka | | B23K 20/1265 |
| 2025/0249531 A1* | 8/2025 | Takeoka | | B23K 20/233 |

FOREIGN PATENT DOCUMENTS

| | | | |
|---|---|---|---|
| JP | 2009241084 A | 10/2009 | |
| JP | 5099009 B2 | 12/2012 | |
| JP | 2018111107 A | 7/2018 | |
| JP | 6579596 B2 | 9/2019 | |
| WO | 2016006377 A1 | 1/2016 | |
| WO | 2018079806 A1 | 5/2018 | |
| WO | 2020184123 A1 | 9/2020 | |
| WO | 2020184124 A1 | 9/2020 | |

OTHER PUBLICATIONS

Cintia Cristiane Petry Mazzaferro et al., Microstructure evaluation and mechanical properties of a friction stir spot welded TRIP 800 steel, Welding International, Sep. 2011, pp. 683-690, vol. 25, No. 9.

G.M. Xie et al., Effect of Rotation Rate on Microstructure and Mechanical Properties of Friction Stir Spot Welded DP780 Steel, Journal of Materials Science & Technology, 2016, pp. 326-332, vol. 32.

M. Ghosh et al., Analysis of microstructural evolution during friction stir welding of ultrahigh-strength steel, Scripta Materialia, 2010, pp. 851-854, vol. 63.

Sep. 16, 2024, the Extended European Search Report issued by the European Patent Office in the corresponding European Patent Application No. 22864102.3.

* cited by examiner

FRICTION STIR SPOT WELDED JOINT AND PRODUCTION METHOD THEREFOR, AND FRICTION STIR SPOT WELDING METHOD

TECHNICAL FIELD

The present disclosure relates to a friction stir spot welded joint and a production method therefor, and a friction stir spot welding method.

BACKGROUND

In recent years, $CO_2$ emission control has been tightened due to growing concern about environmental problems. In the automobile industry, it has been important to make automotive bodies more lightweight in order to improve fuel efficiency. In view of this, the use of high strength steel sheets, particularly steel sheets with a tensile strength (TS) of 980 MPa or more, in automotive parts has been promoted for thickness reduction.

When assembling automobiles, press-formed parts are often joined by resistance welding from the viewpoint of cost and efficiency. With resistance welding which involves melting and solidification, however, the cross tensile strength of a welded portion may decrease due to embrittlement of the steel microstructure of the welded portion.

Hence, the application of friction stir spot welding, which is a non-melting welding method, to high strength steel sheets has been studied. Friction stir spot welding is a spot welding method using a friction stir phenomenon. Specifically, while rotating a tool including a shoulder portion and a pin portion protruding from the shoulder portion, the pin portion of the tool is press-fitted (pushed) into materials to be welded that are overlapping metal sheets. This causes the metal sheets to soften and plastically flow, thus welding the overlapping metal sheets.

As a technique related to such friction stir spot welding, for example, JP 5099009 B2 (PTL 1) discloses "A method of processing a metal material, the method comprising: while controlling a processed part of a steel material having a carbon content of 0.15 mass % or more at 723° C. or less, inserting a rod-like rotary tool made of WC into the processed part and rotating the rotary tool to process the steel material."

JP 6579596 B2 (PTL 2) discloses "A low-temperature joining method for metal materials comprising causing two metal materials to face each other at a welded portion to form a welded interface and press-fitting a rotary tool rotated at a predetermined rotation speed into the welded portion to weld the two metal materials, wherein a peripheral speed of an outermost periphery of the rotary tool is set to 51 mm/s or less to introduce strong strain into the welded portion and decrease a recrystallization temperature inherent to the metal materials, and a welding temperature is set to less than the recrystallization temperature inherent to the metal materials to cause recrystallized grains to form at the welded interface."

JP 2018-111107 A (PTL 3) discloses "A joint comprising a welded portion formed by overlapping one steel sheet and an other steel sheet, wherein an interface between the one steel sheet and the other steel sheet is present in the welded portion, the interface has, in a section of the welded portion, a parallel interface that is an extension of a boundary between the one steel sheet and the other steel sheet and a central interface that is bent from the parallel interface toward the one steel sheet as it approaches a center of the welded portion in plan view, an average hardness of a region 0.05 mm or more and 0.5 mm or less away from the central interface in a direction parallel to the sheet surface on a side of the center of the welded portion in plan view is 350 HV to 450 HV, and an average hardness on an extended line of the parallel interface from a boundary point between the parallel interface and the central interface toward the center of the welded portion in plan view is 400 HV to 550 HV."

WO 2016/006377 A1 (PTL 4) discloses "A friction stir spot welding tool for performing friction stir spot welding of a first part and a second part by overlapping the first part and the second part and pressing the friction stir spot welding tool against the first part and the second part from the first part side, wherein each of the first part and the second part is a steel sheet having a tensile strength of 590 MPa or more, the friction stir spot welding tool is rotatable around a rotation axis and includes a column portion having a shoulder at a tip thereof and a cylindrical or truncated conical probe protruding from the shoulder in a direction of extension of the rotation axis, and when t (mm) is a thickness of the second part and second part insertion volume V (mm³) is a volume of the probe inserted into the second part during the pressing, a relationship between V and t satisfies a following formula (1):

$$V \geq 2.75t^2 + 8.19t - 4.19(t \geq 0.5 \text{ mm}).\text{"} \tag{1}$$

CITATION LIST

Patent Literature

PTL 1: JP 5099009 B2
PTL 2: JP 6579596 B2
PTL 3: JP 2018-111107 A
PTL 4: WO 2016/006377 A1

SUMMARY

Technical Problem

However, in the case where the technique described in PTL 1 is applied to high strength steel sheets, particularly steel sheets with a tensile strength (TS) of 980 MPa or more, the joint strength of the welded portion (hereafter also simply referred to as "joint strength") is insufficient. In the case where the techniques described in PTL 2 to PTL 4 are each applied to high strength steel sheets, too, the joint strength is insufficient.

It could therefore be helpful to provide a friction stir spot welded joint having high joint strength even in the case where a high strength steel sheet, particularly a steel sheet with a tensile strength (TS) of 980 MPa or more, is used as a material to be welded, and a production method therefor.

It could also be helpful to provide a friction stir spot welding method for obtaining the friction stir spot welded joint.

Herein, "high joint strength" means that the cross tensile strength measured by a cross tensile test in accordance with JIS Z 3137 is 7.0 kN or more.

Solution to Problem

Upon careful examination, we discovered that high joint strength can be obtained even in the case where a high strength steel sheet, particularly a steel sheet with a tensile strength (TS) of 980 MPa or more, is used as a material to be welded by:

forming an annular groove on the upper surface of a welded portion, and appropriately controlling the shape, microstructure, and hardness of the welded portion simultaneously, specifically, satisfying the following (a) to (d) simultaneously:

(a) The vertical position of the deepest point of the recess of the welded portion satisfies at least one of −0.5 mm or less and −TL×0.50 or less, with the lower mating surface of the steel sheets which are the materials to be welded as a reference position.

(b) The vertical position of the highest point of the welding interface is +TU×0.50 or more, with the upper mating surface of the steel sheets which are the materials to be welded as a reference position.

(c) The microstructure of a predetermined region in the welded portion has a volume fraction of polygonal ferrite of 70% or more and 99% or less, a volume fraction of hard phase of 1% or more and 30% or less, and an average aspect ratio of polygonal ferrite of 3.0 or less.

(d) The average hardness of the welded portion at the same vertical position as the upper mating surface of the steel sheets as the materials to be welded is 400 HV or less.

Upon further examination, we discovered that, in order to obtain the foregoing friction stir spot welded joint, it is important to satisfy the following (e) to (g) simultaneously during welding:

(e) The vertical position of the maximum press-fitting depth of the tool satisfies at least one of −0.5 mm or less and −TL×0.50 or less with the lower mating surface of the steel sheets as a reference position, and the shoulder and the upper sheet of the material to be welded are in contact with each other (i.e. the material to be welded is pressed by the shoulder) when the tool reaches the maximum press-fitting depth.

(f) The maximum arrival temperature is 600° C. or more and 750° C. or less.

(g) The rotation speed of the tool is changed from the initial rotation speed one or more times during welding so as to satisfy the following formula (1):

$$Rf/R1 \leq 0.60 \tag{1}$$

where R1 is the initial rotation speed (rpm) of the tool, and Rf is the minimum rotation speed (rpm) of the tool.

The present disclosure is based on these discoveries and further studies.

We thus provide:

1. A friction stir spot welded joint comprising: two or more overlapping steel sheets; a welded portion of the steel sheets; and an annular groove on an upper surface of the welded portion, wherein the welded portion includes a recess, a first flow portion adjacent to the recess, a second flow portion adjacent to the first flow portion, and a welding interface that is a boundary between the first flow portion and the second flow portion, a vertical position of a deepest point of the recess satisfies at least one of −0.5 mm or less and −TL×0.50 or less, with a lower mating surface of the steel sheets as a reference position, a vertical position of a highest point of the welding interface is +TU×0.50 or more, with an upper mating surface of the steel sheets as a reference position, in the welded portion, a microstructure of a region from +TU×0.20 to +TU×0.50 in vertical position with the upper mating surface of the steel sheets as a reference position and from (a position of the welding interface−400 μm) to (the position of the welding interface+100 μm) in horizontal position with a center position of the recess as a reference position has a volume fraction of polygonal ferrite of 70% or more and 99% or less, a volume fraction of hard phase of 1% or more and 30% or less, and an average aspect ratio of the polygonal ferrite of 3.0 or less, an average hardness of the welded portion at a same vertical position as the upper mating surface of the steel sheets is 400 HV or less, the two or more overlapping steel sheets include an upper sheet and a lower sheet that are respectively a steel sheet located at a top and a steel sheet located at a bottom, TU is a thickness in mm of the upper sheet, TL is a thickness in mm of the lower sheet, the upper mating surface is a mating surface between the upper sheet and a steel sheet adjacent to the upper sheet, the lower mating surface is a mating surface between the lower sheet and a steel sheet adjacent to the lower sheet, and the vertical position is + when above the reference position and is − when below the reference position, and the horizontal position is a distance from the reference position.

2. The friction stir spot welded joint according to 1., wherein at least one of the steel sheets has a chemical composition containing (consisting of), in mass %, C: 0.10% or more, Si and Al: 0.5% or more in total, Mn: 1.5% or more, P: 0.10% or less, S: 0.050% or less, and N: 0.010% or less, with a balance consisting of Fe and inevitable impurities.

3. The friction stir spot welded joint according to 2., wherein the chemical composition further contains, in mass %, one or more selected from Nb: 0.050% or less, Ti: 0.050% or less, B: 0.0050% or less, V: 0.05% or less, Cr: 0.50% or less, Mo: 0.50% or less, Co: 0.50% or less, Cu: 0.50% or less, Ni: 0.50% or less, Sb: 0.020% or less, and Ca and REM: 0.010% or less in total.

4. The friction stir spot welded joint according to any one of 1. to 3., wherein at least one of the steel sheets has a tensile strength of 980 MPa or more.

5. The friction stir spot welded joint according to any one of 1. to 4, wherein at least one of the steel sheets has a coated layer on a surface thereof.

6. The friction stir spot welded joint according to 5., wherein the coated layer is a zinc or zinc alloy coated layer.

7. A friction stir spot welding method comprising, while rotating a tool including a shoulder portion and a pin portion protruding from the shoulder portion, press-fitting the pin portion into two or more overlapping steel sheets as materials to be welded to weld the steel sheets, wherein a rotation speed of the tool is changed from an initial rotation speed one or more times during welding, a vertical position of a maximum press-fitting depth of the tool satisfies at least one of −0.5 mm or less and −TL×0.50 or less with a lower mating surface of the steel sheets as a reference position, and the shoulder portion and an upper sheet are in contact with each other when the tool reaches the maximum press-fitting depth, a maximum arrival temperature is 600° C. or more and 750° C. or less, the following formula (1) is satisfied:

$$Rf/R1 \leq 0.60 \tag{1}$$

where R1 is the initial rotation speed in rpm of the tool, and Rf is a minimum rotation speed in rpm of the tool, the two or more overlapping steel sheets include the upper sheet and a lower sheet that are respectively a steel sheet located at a top and a steel sheet located at a bottom, TL is a thickness in mm of the lower sheet, the lower mating surface is a mating surface between the lower sheet and a steel sheet adjacent to the lower sheet, and the vertical position is + when above the reference position and is – when below the reference position.

8. A production method for a friction stir spot welded joint, comprising welding two or more overlapping steel sheets by the friction stir spot welding method according to claim 7.

Advantageous Effect

It is thus possible to obtain a friction stir spot welded joint having high joint strength even in the case where a high strength steel sheet, particularly a steel sheet with a tensile strength (TS) of 980 MPa or more, is used as a material to be welded. This is very useful in industrial terms because automotive bodies can be made more lightweight to improve fuel efficiency.

DETAILED DESCRIPTION

The presently disclosed techniques will be described by way of embodiments below.

[1] Friction Stir Spot Welded Joint

Figure 1:
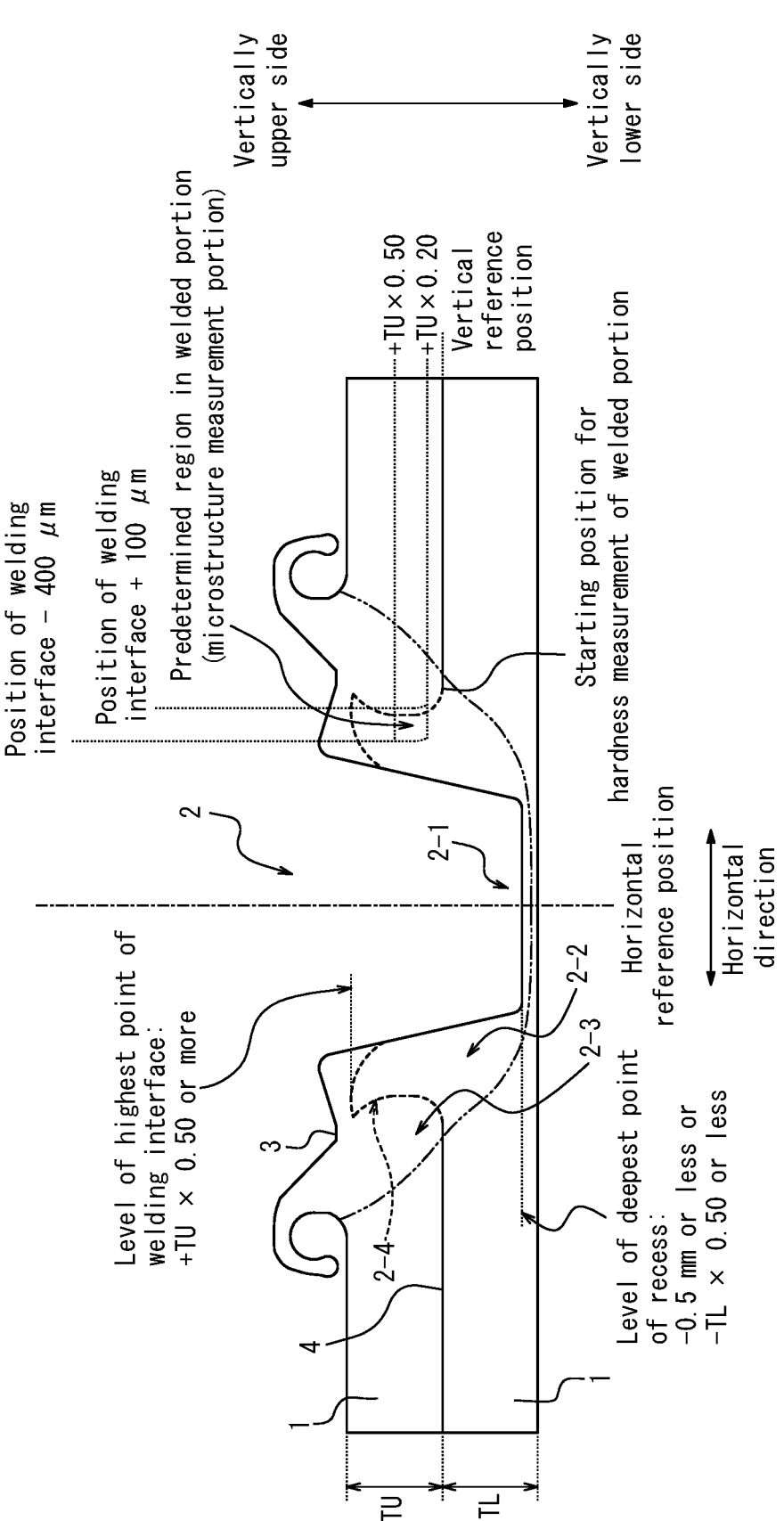
FIG. 1 is a schematic diagram of a vertical section of a friction stir spot welded joint according to an embodiment of the present disclosure.

First, a friction stir spot welded joint according to an embodiment of the present disclosure will be described with reference to FIG. 1. An example in which the materials to be welded are two steel sheets is used in FIG. 1. FIG. 1 illustrates a vertical section of a friction stir spot welded joint passing through the center position of a recess of a welded portion (hereafter also simply referred to as "vertical section"), and the position of each part is in the vertical section.

The vertically (the steel sheet thickness direction) upper side is the side on which a pin portion of a tool is press-fitted during friction stir spot welding. The vertically lower side is the side on which a backing material is installed during friction stir point welding (i.e. the side opposite to the side on which the pin portion of the tool is press-fitted during friction stir point welding). The vertically upper side and lower side of a friction stir spot welded joint can be identified from the shape of the joint, e.g. the position of the recess. Of the steel sheets as the materials to be welded, the uppermost steel sheet (the steel sheet located at the top) is also referred to as "upper sheet", the lowermost steel sheet (the steel sheet located at the bottom) as "lower sheet", and each steel sheet located between the top and the bottom (each steel sheet other than the top and the bottom) as "intermediate sheet". An upper surface is a surface on the vertically upper side, and a lower surface is a surface on the vertically lower side.

As illustrated in FIG. 1, the friction stir spot welded joint according to an embodiment of the present disclosure includes overlapping steel sheets 1, a welded portion 2 of the steel sheets, and an annular groove 3 on the upper surface of the welded portion. The gap remaining between the overlapping steel sheets (without being welded) is an unwelded interface 4.

[Welded Portion]

As illustrated in FIG. 1, the welded portion includes a recess 2-1, a first flow portion 2-2 adjacent to the recess, a second flow portion 2-3 adjacent to the first flow portion, and a welding interface 2-4 that is the boundary between the first flow portion and the second flow portion.

The recess is formed by press-fitting the pin portion of the tool during welding. The recess is approximately circular when viewed from above in the vertical direction, and its diameter is approximately equal to the diameter of the pin portion of the tool. The center position of the recess is the center of the recess when viewed from above in the vertical direction.

The first flow portion is a flow region formed by plastic flow of the lower sheet during welding, and is adjacent to the periphery of the recess. The second flow portion is a flow region formed by plastic flow of the upper sheet, and is adjacent to the first flow portion. In the case where the number of steel sheets as the materials to be welded is three or more, a flow region formed by plastic flow of each intermediate sheet is included in the second flow portion.

The first flow portion and the second flow portion are defined as follows. This identifies the welding interface which is the boundary between the first flow portion and the second flow portion.

The vertical section of the friction stir spot welded joint passing through the center position of the recess of the welded portion is polished and etched with a saturated picric acid solution. The vertical section is then observed with an optical microscope, and the first flow portion and the second flow portion are defined based on, for example, the degrees of etching in the base metal microstructure and the flow portions. The boundary between the defined first flow portion and second flow portion is taken to be the welding interface.

It is important to control the shape, microstructure, and hardness of the welded portion as follows.

Here, the two or more overlapping steel sheets include the upper sheet and the lower sheet that are respectively the steel sheet located at the top and the steel sheet located at the bottom, TU is the thickness (mm) of the upper sheet, TL is the thickness (mm) of the lower sheet, the upper mating surface is the mating surface between the upper sheet and the steel sheet adjacent to the upper sheet, and the lower mating surface is the mating surface between the lower sheet and the steel sheet adjacent to the lower sheet.

The vertical position is + when above the reference position and is – when below the reference position. The horizontal position is the distance from the reference position (the reference position is 0, and the horizontal position is not – (i.e. does not take a negative value)).

(a) Vertical Position of Deepest Point of Recess (Hereafter Also Referred to as "Level of Deepest Point of Recess")

The level of the deepest point of the recess satisfies at least one of –0.5 mm or less and –TL×0.50 or less, with the lower mating surface of the steel sheets which are the materials to be welded as a reference position. Thus, the welding interface is strengthened and high joint strength is obtained even in the case where a high strength steel sheet is used as a material to be welded. The level of the deepest point of the recess is preferably −TL×0.90 or more, without being limited thereto.

(b) Vertical Position of Highest Point of Welding Interface (Hereafter Also Referred to as "Level of Highest Point of Welding Interface")

The level of the highest point of the welding interface is +TU×0.50 or more, with the upper mating surface of the steel sheets which are the materials to be welded as a reference position. The level of the highest point of the welding interface is preferably +TU×0.60 or more. Thus, the welding interface is strengthened and high joint strength is obtained even in the case where a high strength steel sheet is used as a material to be welded. A higher level of the highest point of the welding interface is more preferable. For example, the level of the highest point of the welding interface may reach a region discharged to the outside as burrs from the periphery of the shoulder portion of the tool. The level of the highest point of the welding interface is more preferably +TU×0.98 or less.

The welding interface typically has a shape that is curved toward the vertically upper side (i.e. a shape that is convex upward in the vertical direction) in the vertical section.

The level of the deepest point of the recess and the level of the highest point of the welding interface can be measured with a caliper square or the like using a photographed image of the vertical section of the friction stir spot welded joint used to identify the welding interface.

Microstructure of region from +TU×0.20 to +TU×0.50 in vertical position with upper mating surface of steel sheets as reference position and from (position of welding interface− 400 μm) to (position of welding interface+100 μm) in horizontal position with center position of recess as reference position in welded portion (hereafter also referred to as "predetermined region in welded portion")

The microstructure of the predetermined region in the welded portion has a volume fraction of polygonal ferrite of 70% or more and 99% or less, a volume fraction of hard phase of 1% or more and 30% or less, and an average aspect ratio of polygonal ferrite of 3.0 or less. Thus, even in the case where a high strength steel sheet is used as a material to be welded, good toughness is obtained in the welded portion and consequently high joint strength is obtained. If at least one of the volume fraction of polygonal ferrite, the volume fraction of hard phase, and the average aspect ratio of polygonal ferrite is outside the foregoing range, in the case where a high strength steel sheet is used as a material to be welded, good toughness cannot be obtained in the welded portion and consequently the joint strength decreases.

The volume fraction of polygonal ferrite is preferably 75% or more. The volume fraction of polygonal ferrite is preferably 97% or less. The volume fraction of hard phase is preferably 3% or more. The volume fraction of hard phase is preferably 25% or less.

The volume fraction of residual microstructures other than the polygonal ferrite and hard phase is preferably 20% or less. Examples of the residual microstructures include other microstructures known as microstructures of steel sheets, such as bainite, retained austenite, and pearlite. The residual microstructures may be identified, for example, through observation using a scanning electron microscope (SEM).

The volume fraction of the residual microstructures is calculated according to the following formula:

$$[\text{Volume fraction (\%) of residual microstructures}]= 100-[\text{volume fraction (\%) of polygonal ferrite}]- [\text{volume fraction (\%) of hard phase}].$$

For example, the volume fractions of polygonal ferrite and hard phase are measured in the following manner.

A test piece is cut out from the friction stir spot welded joint so that the predetermined region in the welded portion in the vertical section of the friction stir spot welded joint illustrated in FIG. 1 (i.e. the vertical section of the friction stir spot welded joint passing through the center position of the recess in the welded portion) will be an observation plane. The observation plane of the test piece is then polished and etched with 3 vol % nital to reveal the microstructure. Next, the predetermined region in the welded portion is photographed using a scanning electron microscope (SEM) with 10000 magnification for a total of six observation fields: four observation fields from a region (first flow portion) on the recess side of the welding interface (i.e. the side closer to the recess with respect to the welding interface) and two observation fields from a region (second flow portion) on the side of the welding interface opposite to the recess side (i.e. the side farther from the recess with respect to the welding interface). From the obtained microstructure images, the areas of polygonal ferrite and hard phase are calculated for each of the six observation fields using Adobe Photoshop available from Adobe Systems Co., Ltd. The areas of polygonal ferrite and hard phase calculated for each observation field are then divided by the area of the observation field region. The respective arithmetic mean values of these values are then taken to be the volume fractions of polygonal ferrite and hard phase.

In the microstructure images, polygonal ferrite exhibits black microstructure and hard phase exhibits gray microstructure. Polygonal ferrite and hard phase are thus identified. Hard phase is composed of carbides such as martensite and cementite.

The average aspect ratio of polygonal ferrite is preferably 2.5 or less. No lower limit is placed on the average aspect ratio of polygonal ferrite, but the average aspect ratio of polygonal ferrite is preferably 1.2 or more.

For example, the average aspect ratio of polygonal ferrite is measured in the following manner.

In the microstructure images obtained in the measurement of the volume fractions of polygonal ferrite and hard phase, five crystal grains observed in the region determined to be polygonal ferrite are randomly selected for each observation field. For each of the selected five crystal grains, the major axis length and the minor axis length are determined, and the major axis length is divided by the minor axis length. The average value of the resultant values is taken to be the average aspect ratio of polygonal ferrite.

The major axis length is the maximum diameter of the crystal grain on a straight line passing through the center of gravity of the crystal grain. The minor axis length is the minimum diameter of the crystal grain on a straight line passing through the center of gravity of the crystal grain.

The reason that the region whose microstructure is specified in the welded portion is the region from +TU×0.20 to +TU×0.50 in vertical position with the upper mating surface of the steel sheets as a reference position and from (the position of the welding interface−400 μm) to (the position of the welding interface+100 μm) in horizontal position with the center position of the recess as a reference position in the welded portion is as follows.

In a cross tensile test, a fracture may occur around the welding interface. The fracture origin in such a case tends to be located at the region of the vicinity of the welding interface from +TU×0.20 to +TU×0.50 in vertical position with respect to the upper mating surface as a reference position. In particular, the region from (the position of the welding interface−400 μm) to (the position of the welding interface+100 μm) in horizontal position with the center position of the recess as a reference position tends to be the fracture path. Hence, this region is set as the region whose microstructure is specified in the welded portion.

Here, since the position of the welding interface (position in the horizontal direction) differs depending on the vertical position (level), each of (the position of the welding interface−400 μm) and (the position of the welding interface+100 μm) also differs depending on the vertical position (level).

For example, the horizontal position of the welding interface at vertical position: +TU×0.20 and the horizontal position of the welding interface at vertical position: +TU×0.50 do not necessarily match. Therefore, the horizontal position of (the position of the welding interface−400 μm) at vertical position: +TU×0.20 and the horizontal position of (the position of the welding interface−400 μm) at vertical position: +TU×0.50 do not necessarily match.

(d) Average Hardness of Welded Portion at the Same Vertical Position as Upper Mating Surface of Steel Sheets (Hereafter Also Referred to as "Average Hardness of Welded Portion")

The average hardness of the welded portion is 400 HV or less. Thus, even in the case where a high strength steel sheet is used as a material to be welded, good toughness is obtained in the welded portion and consequently high joint strength is obtained. If the average hardness of the welded portion is more than 400 HV, in the case where a high strength steel sheet is used as a material to be welded, good toughness cannot be obtained in the welded portion and consequently the joint strength decreases. The average hardness of the welded portion is preferably 380 HV or less. The average hardness of the welded portion is preferably 250 HV or more.

The average hardness of the welded portion is measured in accordance with JIS Z 2244. Specifically, the measurement is performed in the following manner.

The vertical section of the friction stir spot welded joint illustrated in FIG. 1 (i.e. the vertical section of the friction stir spot welded joint passing through the center position of the welded portion) is used as a measurement plane. Starting from the position of the welding interface at the same vertical position (level) as the upper mating surface of the steel sheets on the measurement plane, Vickers hardness (HV) is measured in the horizontal direction toward the recess under the conditions of test force=2.942 N and measurement interval=0.2 mm (until the recess is reached). The arithmetic mean value of these measured values is then taken to be the average hardness of the welded portion.

[Annular Groove]

The annular groove is formed on the upper surface of the welded portion, as illustrated in FIG. 1. The annular groove is located on the upper surface of the welded portion so as to surround the recess. In detail, the annular groove is formed as a result of contact between the shoulder portion of the tool and the upper sheet during welding. The formation of the annular groove strengthens the welding interface. Hence, high joint strength is obtained even in the case where a high strength steel sheet is used as a material to be welded.

Whether the annular groove is present can be determined by visually observing the appearance of the upper surface of the friction stir spot welded joint and observing the vertical section of the friction stir spot welded joint.

[Steel Sheet]

The number of steel sheets as the materials to be welded is two or more. Although no upper limit is placed on the number of steel sheets as the materials to be welded, the number of steel sheets as the materials to be welded is preferably five or less. The steel sheets as the materials to be welded may be steel sheets of the same steel type or steel sheets of different steel types.

The sheet thickness of the steel sheets as the materials to be welded is preferably 0.4 mm to 3.2 mm. The steel sheets as the materials to be welded may be steel sheets of the same sheet thickness or steel sheets of different sheet thicknesses.

As at least one of the steel sheets as the materials to be welded, it is preferable to use a high strength steel sheet, for example, a steel sheet having a chemical composition containing, in mass %, C: 0.10% or more,
    Si and Al: 0.5% or more in total,
    Mn: 1.5% or more,
    P: 0.10% or less,
    S: 0.050% or less, and
    N: 0.010% or less,
    with the balance consisting of Fe and inevitable impurities. While the unit of the content of each element in the chemical composition is "mass %", the content is expressed simply in "%" unless otherwise specified.

C: 0.10% or More

C is an element effective in increasing the strength of the steel sheet. C also effectively contributes to the formation of carbides (corresponding to hard phase) in the microstructure of the predetermined region in the welded portion. The C content is therefore preferably 0.10% or more. The C content is more preferably 0.15% or more. Although not limited, the C content is preferably 1.0% or less from the viewpoint of preventing a decrease in delayed fracture resistance.

Si and Al: 0.5% or More in Total

Si and Al are elements that suppress excessive formation of carbides in the welded portion and suppress a decrease in the toughness of the welded portion. The total content of Si and Al is therefore preferably 0.5% or more. Although not limited, the total content of Si and Al is preferably 4.0% or less from the viewpoint of preventing a decrease in coatability.

Mn: 1.5% or More

Mn is an element that contributes to higher strength by solid solution strengthening and by forming hard phase (which is secondary phase). Mn also stabilizes austenite and is also effective in controlling the fraction of the hard phase. The Mn content is therefore preferably 1.5% or more. Although not limited, the Mn content is preferably 10% or less from the viewpoint of preventing a decrease in coatability.

P: 0.10% or Less

If the P content is excessively high, the segregation of P to the grain boundaries is noticeable, as a result of which the grain boundaries may become brittle. The P content is therefore preferably 0.10% or less. Although not limited, the P content is preferably 0.005% or more because extremely low P content leads to an increase in steelmaking costs.

S: 0.050% or Less

If the S content is high, a large amount of sulfides such as MnS form, which may cause a decrease in joint strength. The S content is therefore preferably 0.050% or less. Although not limited, the S content is preferably 0.0002% or more because extremely low S content leads to an increase in steelmaking costs.

N: 0.010% or Less

N may cause a decrease in joint strength by forming coarse nitrides. Accordingly, it is preferable to reduce the N content, and the N content is preferably 0.010% or less. Although not limited, the N content is preferably 0.0005% or more because extremely low N content leads to an increase in steelmaking costs.

In addition to the foregoing basic chemical composition, one or more selected from Nb: 0.050% or less, Ti: 0.050% or less, B: 0.0050% or less, V: 0.05% or less, Cr: 0.50% or less, Mo: 0.50% or less, Co: 0.50% or less, Cu: 0.50% or less, Ni: 0.50% or less, Sb: 0.020% or less, and Ca and REM: 0.010% or less in total may be further contained.

Nb: 0.050% or Less

Nb forms fine carbonitrides and refines the prior austenite grain size. This contributes to improvement in joint strength. From the viewpoint of achieving such effect, the Nb content is preferably 0.005% or more. If the Nb content is excessively high, elongation decreases. Moreover, slab cracking is likely to occur after continuous casting. Accordingly, in the case where Nb is contained, the Nb content is preferably 0.050% or less. The Nb content is more preferably 0.045% or less, and further preferably 0.040% or less.

Ti: 0.050% or Less

Ti forms fine carbonitrides and refines the prior austenite grain size, as with Nb. This contributes to improvement in joint strength. From the viewpoint of achieving such effect, the Ti content is preferably 0.005% or more. The Ti content is more preferably 0.008% or more. If the Ti content is excessively high, elongation decreases. Accordingly, in the case where Ti is contained, the Ti content is preferably 0.050% or less. The Ti content is more preferably 0.045% or less.

B: 0.0050% or Less

B improves hardenability and suppresses the formation of ferrite and pearlite. This contributes to improvement in base metal strength and joint strength. From the viewpoint of achieving such effect, the B content is preferably 0.0002% or more. If the B content is more than 0.0050%, the effect is saturated. Accordingly, in the case where B is contained, the B content is preferably 0.0050% or less.

V: 0.05% or Less

V is an element that contributes to higher strength by forming fine carbonitrides. From the viewpoint of achieving such effect, the V content is preferably 0.005% or more. If the V content is more than 0.05%, the strength increasing effect decreases, and the costs increase. Accordingly, in the case where V is contained, the V content is preferably 0.05% or less.

Cr: 0.50% or Less

Cr is an element that contributes to higher strength by forming hard phase. From the viewpoint of achieving such effect, the Cr content is preferably 0.05% or more. If the Cr content is more than 0.50%, martensite forms excessively and surface defects are facilitated. Accordingly, in the case where Cr is contained, the Cr content is preferably 0.50% or less. The Cr content is more preferably 0.45% or less.

Mo: 0.50% or Less

Mo is an element that contributes to higher strength by forming hard phase, as with Cr. Mo also partially forms carbides and contributes to higher strength. From the viewpoint of achieving such effect, the Mo content is preferably 0.05% or more. If the Mo content is more than 0.50%, the effect is saturated and the costs increase. Accordingly, in the case where Mo is contained, the Mo content is preferably 0.50% or less. The Mo content is more preferably 0.32% or less.

Co: 0.50% or Less

Co is an element that contributes to improvement in delayed fracture resistance by increasing hydrogen overvoltage. From the viewpoint of achieving such effect, the Co content is preferably 0.05% or more. The Co content is more preferably 0.10% or more. If the Co content is more than 0.50%, the effect is saturated and the costs increase. Accordingly, in the case where Co is contained, the Co content is preferably 0.50% or less. The Co content is more preferably 0.32% or less.

Cu: 0.50% or Less

Cu is an element that contributes to higher strength by solid solution strengthening. Cu also contributes to higher strength by forming hard phase. From the viewpoint of achieving such effect, the Cu content is preferably 0.005% or more. If the Cu content is more than 0.50%, the effect is saturated and the costs increase. In addition, surface defects caused by Cu are likely to occur. Accordingly, in the case where Cu is contained, the Cu content is preferably 0.50% or less.

Ni: 0.50% or Less

Ni is an element that contributes to higher strength by solid solution strengthening, as with Cu. Ni also contributes to higher strength by forming hard phase. Furthermore, Ni, when contained together with Cu, has the effect of suppressing surface defects caused by Cu. It is therefore effective to also add Ni in the case where Cu is contained. From the viewpoint of achieving such effect, the Ni content is preferably 0.005% or more. If the Ni content is more than 0.50%, the effect is saturated. Accordingly, in the case where Ni is contained, the Ni content is preferably 0.50% or less.

Sb: 0.020% or Less

Sb contributes to higher strength by suppressing the formation of a decarburized layer in the surface layer of the steel sheet. From the viewpoint of achieving such effect, the Sb content is preferably 0.001% or more. If the Sb content is more than 0.020%, the rolling load increases and productivity decreases. Accordingly, in the case where Sb is contained, the Sb content is preferably 0.020% or less.

Ca and REM: 0.010% or Less in Total

Ca and REM are elements that contribute to higher strength by making the shape of sulfides spheroidal. From the viewpoint of achieving such effect, the total content of Ca and REM is preferably 0.0005% or more. If the total content of Ca and REM is more than 0.010%, the effect is saturated. Accordingly, in the case where Ca and/or REM is contained, the total content of Ca and REM is preferably 0.010% or less. The total content of Ca and REM is more preferably 0.0050% or less.

The balance other than the above consists of Fe and inevitable impurities. Examples of the inevitable impurities include Sn and Zn, and Sn: 0.01% or less and Zn: 0.01% or less are acceptable. Moreover, adding Ta, Mg, and Zr each within the typical steel composition range, specifically, 0.01% or less, does not undermine the effects.

In the case where the content of any of the foregoing optional elements is less than the (preferred) lower limit, the optional element is included as an inevitable impurity.

As at least one of the steel sheets as the materials to be welded, it is preferable to use a steel sheet with a tensile strength of 980 MPa or more. The tensile strength is measured in accordance with JIS Z 2241 (1998).

At least one of the steel sheets as the materials to be welded may have a coated or plated layer on its surface. The coated or plated layer may be provided on both sides of the steel sheet or one side of the steel sheet. The coated or plated layer is, for example, a zinc or zinc alloy coated layer. The zinc or zinc alloy coated layer is a coated layer mainly composed of zinc (a coated layer having a zinc content of 50 mass % or more), and examples thereof include a hot-dip galvanized layer, a galvannealed layer, and an electrogalvanized layer.

The steel sheets described above can be produced according to a conventional method.

[2] Friction Stir Spot Welding Method, and Production Method for Friction Stir Spot Welded Joint Next, a friction stir spot welding method according to an embodiment of the present disclosure and a production method for a friction stir spot welded joint according to an embodiment of the present disclosure will be described.

The friction stir spot welding method according to an embodiment of the present disclosure is a friction stir spot welding method comprising, while rotating a tool including a shoulder portion and a pin portion protruding from the shoulder portion, press-fitting the pin portion into two or more overlapping steel sheets as materials to be welded to weld the steel sheets, wherein a rotation speed of the tool is changed from an initial rotation speed one or more times during welding, a vertical position of a maximum press-fitting depth of the tool satisfies at least one of −0.5 mm or less and −TL×0.50 or less with a lower mating surface of the steel sheets as a reference position, and the shoulder portion and an upper sheet are in contact with each other when the tool reaches the maximum press-fitting depth, a maximum arrival temperature is 600° C. or more and 750° C. or less, the following formula (1) is satisfied:

$$Rf/R1 \leq 0.60 \qquad (1)$$

where R1 is the initial rotation speed (rpm) of the tool, and Rf is a minimum rotation speed (rpm) of the tool, the two or more overlapping steel sheets include the upper sheet and a lower sheet that are respectively a steel sheet located at a top and a steel sheet located at a bottom, TL is a thickness (mm) of the lower sheet, the lower mating surface is a mating surface between the lower sheet and a steel sheet adjacent to the lower sheet, and the vertical position is + when above the reference position and is − when below the reference position.

The friction stir spot welding method according to an embodiment of the present disclosure is a method for obtaining the above-described friction stir spot welded joint according to an embodiment of the present disclosure.

The production method for a friction stir spot welded joint according to an embodiment of the present disclosure comprises welding two or more overlapping steel sheets by the above-described friction stir spot welding method.

The production method for a friction stir spot welded joint according to an embodiment of the present disclosure is a method for producing the above-described friction stir spot welded joint according to an embodiment of the present disclosure.

Two or more overlapping steel sheets as the materials to be welded are welded using the tool including the shoulder portion and the pin portion protruding from the shoulder portion. Specifically, while rotating the tool, the pin portion of the tool is press-fitted into the materials to be welded to weld the steel sheets. The tool is not limited, and a typical tool can be used. The shapes of the shoulder portion and the pin portion, such as the diameter of the shoulder portion (hereafter also referred to as "shoulder diameter"), the diameter of the pin portion (hereafter also referred to as "pin diameter"), the length of the pin portion (hereafter also referred to as "pin length"), and the side tilt angle of the pin, are not limited, and may be determined depending on the steel type and thickness of the steel sheets as the materials to be welded. For example, in the case where two steel sheets having a tensile strength of 980 MPa or more and a thickness of 1.6 mm are used as the materials to be welded, it is preferable to set the shoulder diameter to 6.0 mm to 16.0 mm, the pin diameter to 3.0 mm to 8.0 mm, the pin length to 2.0 mm to 3.5 mm, and the pin side tilt angle to 3° to 30°.

During welding, a backing material is installed on the lower surface of the materials to be welded (i.e. the side opposite to the side on which the pin portion of the tool is press-fitted).

In the friction stir spot welding method according to an embodiment of the present disclosure, it is important to satisfy the following conditions.

(e) Vertical Position of Maximum Press-Fitting Depth of Tool

The vertical position of the maximum press-fitting depth of the tool satisfies at least one of −0.5 mm or less and −TL×0.50 or less with the lower mating surface of the steel sheets as a reference position, and the shoulder and the upper sheet of the material to be welded are in contact with each other (i.e. the material to be welded is pressed by the shoulder) when the tool reaches the maximum press-fitting depth. By appropriately controlling the vertical position of the press-fitting depth of the tool, it is possible to promote material flow and make the highest point of the welding interface higher. Moreover, as a result of the shoulder and the upper sheet of the material to be welded coming into contact with each other, the overlapping steel sheets are brought into closer contact with each other and the welding interface is strengthened. The vertical position of the press-fitting depth of the tool is preferably −TL×0.90 or more, without being limited thereto.

(f) Maximum Arrival Temperature

The maximum arrival temperature of the welded portion during welding is 600° C. or more and 750° C. or less. This enables the microstructure of the predetermined region in the welded portion to have a volume fraction of polygonal ferrite of 70% or more and 99% or less and a volume fraction of hard phase of 1% or more and 30% or less. The maximum arrival temperature is preferably 640° C. or more. The maximum arrival temperature is preferably 720° C. or less.

For example, the maximum arrival temperature is measured in the following manner.

A thermocouple is installed inside the tool, specifically, near the tip of the pin portion of the tool that comes into contact with the welded portion. The temperature during welding (the temperature increasing in the welded portion) is continuously measured using the thermocouple inside the tool, and the maximum temperature measured during welding is taken to be the maximum arrival temperature.

(g) Rotation Speed of Tool

The rotation speed of the tool is changed from the initial rotation speed one or more times during welding so as to satisfy the following formula (1). This enables the microstructure of the predetermined region in the welded portion to have an average aspect ratio of polygonal ferrite of 3.0 or less.

$$Rf/R1 \leq 0.60 \tag{1}$$

where R1 is initial rotation speed (rpm) of the tool, and Rf is the minimum rotation speed (rpm) of the tool.

Rf/R1 is preferably 0.50 or less. Rf/R1 is preferably 0.10 or more.

The initial rotation speed of the tool is not limited as long as the formula (1) is satisfied, and may be determined depending on the steel type and sheet thickness of the steel sheets as the materials to be welded. For example, in the case where two steel sheets having a tensile strength of 980 MPa or more and a thickness of 1.6 mm are used as the materials to be welded, the initial rotation speed of the tool is preferably 300 rpm to 1000 rpm.

The number of times the rotation speed of the tool is switched is not limited as long as it is one or more times, but is preferably 5 times or less.

The timing of switching the rotation speed of the tool is not limited. For example, in the case where two steel sheets having a tensile strength of 980 MPa or more and a thickness of 1.6 mm are used as the materials to be welded, the timing of switching the rotation speed of the tool is preferably the timing at which the press-fitting depth of the tool (pin portion) from the upper surface of the upper sheet reaches 0.8 mm to 2.4 mm.

The pressing force is not limited, but it is preferable to switch the pressing force simultaneously with the rotation speed of the tool. For example, in the case where two steel sheets having a tensile strength of 980 MPa or more and a thickness of 1.6 mm are used as the materials to be welded, it is preferable that the pressing force is 10 kN to 60 kN when the rotation speed of the tool is R1 (initial rotation speed) and 20 kN to 70 kN when the rotation speed of the tool is Rf (minimum rotation speed).

The welding time is preferably 3 seconds to 60 seconds.

The conditions other than those described above are not limited and may be in accordance with conventional methods.

EXAMPLES

Embodiments of the present disclosure will be described in more detail below by way of examples. The present disclosure is not limited by the following examples, and changes can be made as appropriate within the scope of the gist of the present disclosure. These are all included within the technical scope of the present disclosure.

Steels having the chemical compositions shown in Table 1 (with the balance consisting of Fe and inevitable impurities) were each obtained by steelmaking and continuously cast to obtain a slab. The slab was then subjected to hot rolling to obtain a hot-rolled steel sheet. The hot-rolled steel sheet was then subjected to pickling. After this, the hot-rolled steel sheet was subjected to cold rolling and annealing to obtain a cold-rolled steel sheet (thickness: 1.2 mm to 1.6 mm). For steel sample ID C in Table 1, the cold-rolled steel sheet was further subjected to coating treatment to obtain a steel sheet (hot-dip galvanized steel sheet) having a coated layer (hot-dip galvanized layer) on its surface (both sides). A JIS No. 5 tensile test piece was then collected from each obtained steel sheet so that the direction orthogonal to the rolling direction would be the longitudinal direction (tensile direction), and a tensile test in accordance with JIS Z 2241 (1998) was conducted to measure the tensile strength (TS). The results are shown in Table 1.

Test pieces of 50 mm×150 mm were cut out from the obtained steel sheets and overlapped crosswise in the combinations shown in Table 2. In the case of overlapping three or more sheets, the upper sheet and the intermediate sheet were overlapped crosswise and the intermediate sheet and the lower sheet were overlapped in parallel (that is, in the below-described cross tensile strength measurement, the cross tensile strength between the upper sheet and the intermediate sheet was measured). Friction stir spot welding was then performed on the center of the cross overlapping part of the test pieces under the conditions shown in Table 3, to obtain a friction stir spot welded joint.

Regarding the shape of the tool, the shoulder diameter was 10 mm, the pin diameter was 4.8 mm, the pin side tilt angle was 10°, and the pin length was 1.8 mm to 4.6 mm depending on the welding conditions. The rotation speed was switched except for sample Nos. 16 and 18. For the samples for which the rotation speed was switched, the number of times the rotation speed was switched was once except for sample No. 24. For sample No. 24, the number of times the rotation speed was switched was twice. In each case, the timing of switching the rotation speed was based on the tool press-fitting depth from the upper surface of the upper sheet ("tool press-fitting depth at switching" in Table 3 is the tool press-fitting depth from the upper surface of the upper sheet). The pressing force was also switched at the timing of switching the rotation speed.

Figure 2:
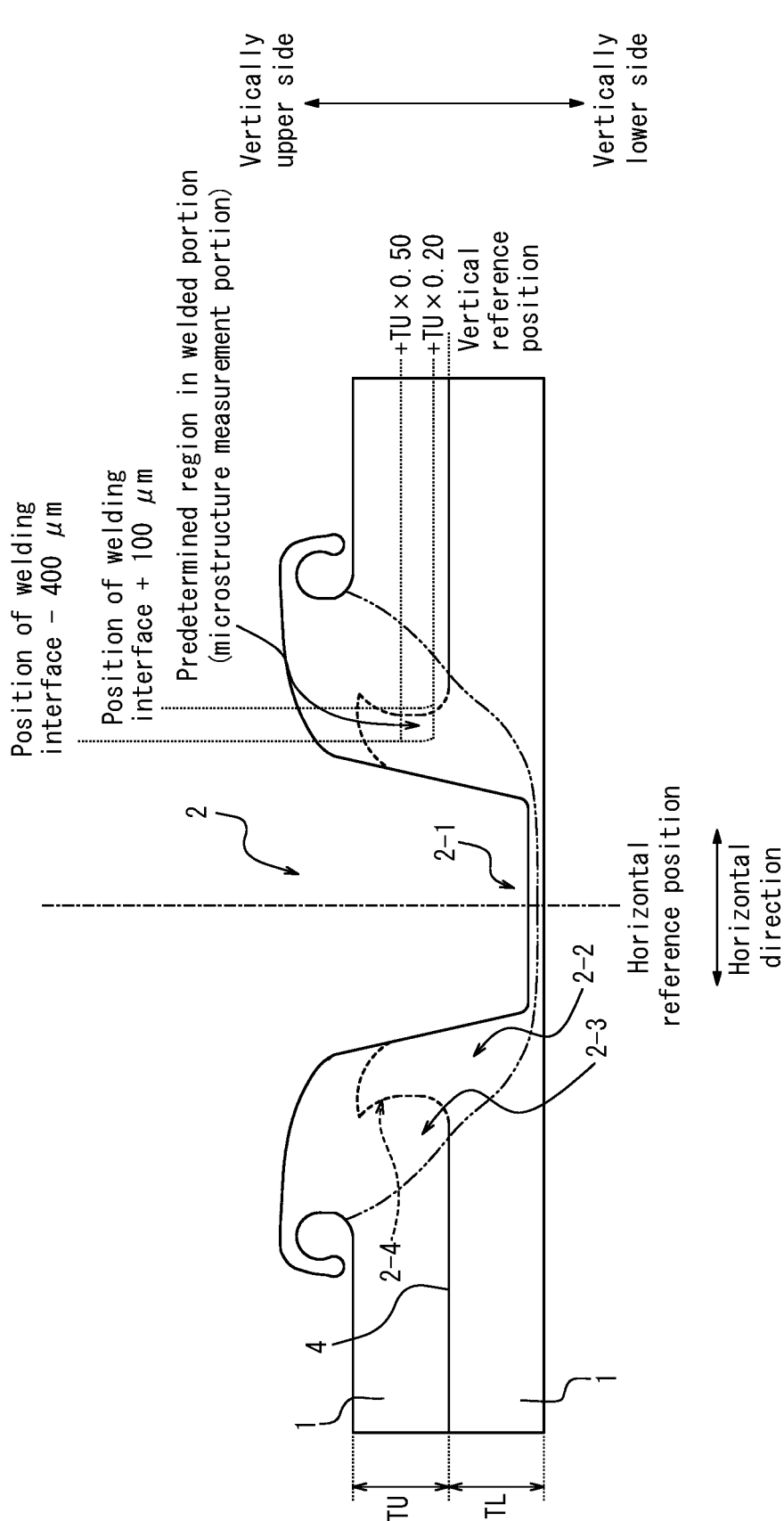
FIG. 2 is a schematic diagram of a vertical section of a friction stir spot welded joint of sample No. 13 (friction stir spot welded joint without an annular groove).

When the tool reached the maximum press-fitting depth, the state of contact between the periphery of the shoulder and the upper sheet was visually checked. As a result, in sample No. 13, the periphery of the shoulder and the upper sheet were not in contact with each other. In all samples other than sample No. 13, the periphery of the shoulder and the upper sheet were in contact with each other when the tool reached the maximum press-fitting depth. For reference, FIG. 2 is a schematic diagram of a vertical section of a friction stir spot welded joint of sample No. 13 (friction stir spot welded joint without an annular groove).

For each of the friction stir spot welded joints thus obtained, the measurement of the level of the deepest point of the recess, the measurement of the level of the highest point of the welding interface, the identification of the microstructure of the predetermined region in the welded portion, the measurement of the average hardness of the welded portion, and the determination of whether an annular groove was present were performed by the foregoing methods. The results are shown in Table 4.

The same friction stir spot welded joints as above were made under the same conditions, and a cross tensile test in accordance with JIS Z 3137 was conducted using these friction stir spot welded joints to measure the cross tensile strength. The results are shown in Table 4. A cross tensile strength of 7.0 kN or more was evaluated as pass.

TABLE 1

| Steel sample ID | Chemical composition (mass %) | | | | | | | | Tensile strength |
|---|---|---|---|---|---|---|---|---|---|
| | C | Si | Mn | P | S | Al | N | Other components | |
| A | 0.47 | 1.5 | 1.5 | 0.01 | 0.001 | 0.03 | 0.004 | Ti: 0.02, B: 0.002, Cu: 0.15 | 1470 MPa |
| B | 0.19 | 1.7 | 2.4 | 0.01 | 0.001 | 0.04 | 0.004 | Ti: 0.02, B: 0.001 | 1180 MPa |
| C | 0.11 | 1.0 | 2.5 | 0.01 | 0.001 | 0.03 | 0.003 | — | 980 MPa |
| D | 0.10 | 0.5 | 1.5 | 0.01 | 0.001 | 0.05 | 0.004 | Nb: 0.03, Ti: 0.02 | 980 MPa |
| E | 0.04 | 0.5 | 1.4 | 0.01 | 0.001 | 0.04 | 0.003 | — | 780 MPa |
| F | 0.13 | 1.22 | 2.3 | 0.01 | 0.001 | 0.04 | 0.003 | Cr: 0.37, Mo: 0.21, V: 0.02 | 980 MPa |
| G | 0.18 | 0.63 | 2.26 | 0.01 | 0.001 | 0.03 | 0.004 | Cu: 0.18, Ni: 0.27, Co: 0.13 | 1180 MPa |
| H | 0.21 | 1.18 | 2.03 | 0.01 | 0.001 | 0.03 | 0.003 | Sb: 0.011, Ca: 0.003, REM: 0.001 | 1180 MPa |
| I | 0.11 | 1.65 | 2.71 | 0.01 | 0.001 | 0.03 | 0.003 | — | 980 MPa |
| J | 0.32 | 0.40 | 1.07 | 0.01 | 0.001 | 0.03 | 0.004 | — | 1470 MPa |

TABLE 2

| | Materials to be welded | | | | | | |
|---|---|---|---|---|---|---|---|
| | Upper sheet | | Lower sheet | | Intermediate sheet | | |
| Sample No. | Steel sample ID | TU mm | Steel sample ID | TL mm | Steel sample ID | Thickness mm | Remarks |
| 1 | A | 1.6 | A | 1.6 | — | — | Example |
| 2 | A | 1.6 | A | 1.6 | — | — | Example |
| 3 | B | 1.6 | B | 1.6 | — | — | Example |
| 4 | B | 1.6 | B | 1.6 | — | — | Example |
| 5 | B | 1.6 | B | 1.6 | — | — | Example |
| 6 | B | 1.6 | B | 1.6 | — | — | Example |
| 7 | B | 1.6 | B | 1.6 | — | — | Example |
| 8 | C | 1.6 | C | 1.6 | — | — | Example |
| 9 | D | 1.6 | D | 1.6 | — | — | Example |
| 10 | A | 1.6 | A | 1.6 | — | — | Comparative Example |
| 11 | B | 1.6 | B | 1.6 | — | — | Comparative Example |
| 12 | B | 1.6 | B | 1.6 | — | — | Comparative Example |
| 13 | B | 1.6 | B | 1.6 | — | — | Comparative Example |
| 14 | B | 1.6 | B | 1.6 | — | — | Comparative Example |
| 15 | B | 1.6 | B | 1.6 | — | — | Comparative Example |
| 16 | B | 1.6 | B | 1.6 | — | — | Comparative Example |
| 17 | B | 1.6 | B | 1.6 | — | — | Comparative Example |
| 18 | E | 1.6 | E | 1.6 | — | — | Comparative Example |
| 19 | F | 1.6 | F | 1.6 | — | — | Example |
| 20 | G | 1.6 | G | 1.6 | — | — | Example |
| 21 | H | 1.6 | H | 1.6 | — | — | Example |
| 22 | B | 1.6 | A | 1.6 | — | — | Example |
| 23 | B | 1.6 | B | 1.6 | B | 1.6 | Example |
| 24 | A | 1.6 | A | 1.6 | — | — | Example |
| 25 | I | 1.2 | I | 1.2 | — | — | Example |
| 26 | J | 1.4 | J | 1.4 | — | — | Example |
| 27 | I | 1.2 | G | 1.6 | — | — | Example |

TABLE 3

| | | | | Welding conditions | | | | | | | | | | |
| Sample No. | Pin length mm | Tool press-fitting depth at first switching mm | Tool press-fitting depth at second switching mm | Pressing force Before switching N | Pressing force After first switching N | Pressing force After second switching N | Tool rotation speed Before switching rpm | Tool rotation speed After first switching rpm | Tool rotation speed After second switching rpm | Rf/R1 — | Vertical position of maximum press-fitting depth of tool mm | Vertical position of maximum press-fitting depth of tool — | Maximum arrival temperature °C | Welding time s | Remarks |
|---|---|---|---|---|---|---|---|---|---|---|---|---|---|---|---|
| 1 | 2.8 | 2.0 | — | 34300 | 41160 | — | 500 | 60 | — | 0.12 | -1.2 | -TL × 0.75 | 675 | 21 | Example |
| 2 | 2.8 | 2.0 | — | 34300 | 41160 | — | 500 | 80 | — | 0.16 | -1.2 | -TL × 0.75 | 699 | 15 | Example |
| 3 | 2.8 | 2.0 | — | 34300 | 41160 | — | 500 | 60 | — | 0.12 | -1.2 | -TL × 0.75 | 663 | 29 | Example |
| 4 | 2.8 | 2.0 | — | 34300 | 41160 | — | 500 | 100 | — | 0.20 | -1.3 | -TL × 0.81 | 732 | 11 | Example |
| 5 | 2.8 | 2.0 | — | 34300 | 41160 | — | 400 | 200 | — | 0.50 | -1.2 | -TL × 0.75 | 714 | 10 | Example |
| 6 | 2.3 | 1.8 | — | 34300 | 41160 | — | 500 | 80 | — | 0.16 | -0.9 | -TL × 0.56 | 665 | 14 | Example |
| 7 | 2.0 | 1.6 | — | 34300 | 41160 | — | 600 | 60 | — | 0.10 | -0.6 | -TL × 0.38 | 668 | 21 | Example |
| 8 | 2.8 | 2.0 | — | 34300 | 41160 | — | 600 | 80 | — | 0.13 | -1.3 | -TL × 0.81 | 679 | 23 | Example |
| 9 | 2.8 | 2.0 | — | 34300 | 41160 | — | 600 | 60 | — | 0.10 | -1.3 | -TL × 0.81 | 662 | 16 | Example |
| 10 | 2.8 | 2.0 | — | 34300 | 41160 | — | 750 | 120 | — | 0.16 | -1.3 | -TL × 0.81 | 781 | 9 | Comparative Example |
| 11 | 2.8 | 2.0 | — | 34300 | 41160 | — | 750 | 130 | — | 0.17 | -1.3 | -TL × 0.81 | 791 | 8 | Comparative Example |
| 12 | 2.8 | 2.0 | — | 34300 | 41160 | — | 500 | 120 | — | 0.24 | -1.2 | -TL × 0.75 | 754 | 10 | Comparative Example |
| 13 | 4.0 | 2.0 | — | 34300 | 41160 | — | 500 | 140 | — | 0.28 | -1.2 | -TL × 0.75 | 732 | 8 | Comparative Example |
| 14 | 1.8 | 1.6 | — | 34300 | 41160 | — | 600 | 100 | — | 0.17 | -0.4 | -TL × 0.25 | 673 | 14 | Comparative Example |
| 15 | 1.8 | 1.4 | — | 34300 | 41160 | — | 700 | 70 | — | 0.10 | -0.4 | -TL × 0.25 | 676 | 16 | Comparative Example |
| 16 | 2.8 | — | — | 34300 | — | — | 350 | — | — | — | -1.2 | -TL × 0.75 | 741 | 7 | Comparative Example |
| 17 | 2.8 | 2.0 | — | 34300 | 41160 | — | 400 | 280 | — | 0.70 | -1.2 | -TL × 0.75 | 742 | 9 | Comparative Example |
| 18 | 2.8 | — | — | 34300 | — | — | 320 | — | — | — | -1.2 | -TL × 0.75 | 684 | 8 | Comparative Example |
| 19 | 2.8 | 2.0 | — | 34300 | 41160 | — | 600 | 80 | — | 0.13 | -1.2 | -TL × 0.75 | 674 | 20 | Example |
| 20 | 2.8 | 2.0 | — | 34300 | 41160 | — | 600 | 60 | — | 0.10 | -1.2 | -TL × 0.75 | 665 | 15 | Example |
| 21 | 2.8 | 2.0 | — | 34300 | 41160 | — | 500 | 60 | — | 0.12 | -1.2 | -TL × 0.75 | 670 | 26 | Example |
| 22 | 2.8 | 1.8 | — | 34300 | 41160 | — | 500 | 80 | — | 0.16 | -1.2 | -TL × 0.75 | 667 | 20 | Example |
| 23 | 4.6 | 3.6 | — | 34300 | 41160 | — | 330 | 80 | — | 0.24 | -1.2 | -TL × 0.75 | 704 | 34 | Example |
| 24 | 2.8 | 1.6 | 2.0 | 34300 | 37240 | 41160 | 500 | 120 | 60 | 0.12 | -1.2 | -TL × 0.75 | 659 | 24 | Example |
| 25 | 1.9 | 1.3 | — | 34300 | 41160 | — | 900 | 120 | — | 0.13 | -0.9 | -TL × 0.75 | 699 | 9 | Example |
| 26 | 2.4 | 1.6 | — | 34300 | 41160 | — | 700 | 90 | — | 0.13 | -1.1 | -TL × 0.79 | 685 | 13 | Example |
| 27 | 2.4 | 1.5 | — | 34300 | 41160 | — | 800 | 100 | — | 0.13 | -1.3 | -TL × 0.81 | 708 | 12 | Example |

TABLE 4

| | | | Microstructure of predetermined region in welded portion | | | | | | | |
| Sample | Level of deepest point of recess | | Level of highest point of welding interface | Volume fraction of polygonal ferrite | Volume fraction of hard phase | Average aspect ratio of polygonal ferrite | Average hardness of welded portion | Presence of annular groove | Cross tensile strength | |
| No. | mm | — | mm | % | % | — | HV | — | kN | Remarks |
|---|---|---|---|---|---|---|---|---|---|---|
| 1 | −1.2 | −TL × 0.75 | +TU × 0.86 | 85 | 15 | 1.2 | 356 | Present | 8.4 | Example |
| 2 | −1.2 | −TL × 0.75 | +TU × 0.89 | 88 | 12 | 1.4 | 343 | Present | 8.6 | Example |
| 3 | −1.2 | −TL × 0.75 | +TU × 0.92 | 93 | 7 | 1.2 | 295 | Present | 11.1 | Example |
| 4 | −1.3 | −TL × 0.81 | +TU × 0.97 | 76 | 24 | 2.0 | 364 | Present | 8.4 | Example |
| 5 | −1.2 | −TL × 0.75 | +TU × 0.94 | 81 | 19 | 1.8 | 338 | Present | 7.7 | Example |
| 6 | −0.9 | −TL × 0.56 | +TU × 0.74 | 94 | 6 | 1.4 | 308 | Present | 7.4 | Example |
| 7 | −0.6 | −TL × 0.38 | +TU × 0.56 | 95 | 5 | 1.4 | 301 | Present | 7.2 | Example |
| 8 | −1.3 | −TL × 0.81 | +TU × 0.79 | 95 | 5 | 1.4 | 298 | Present | 7.9 | Example |
| 9 | −1.3 | −TL × 0.81 | +TU × 0.94 | 98 | 2 | 1.2 | 282 | Present | 7.2 | Example |
| 10 | −1.3 | −TL × 0.81 | +TU × 0.93 | 0 | 100 | — | 517 | Present | 1.3 | Comparative Example |
| 11 | −1.3 | −TL × 0.81 | +TU × 0.94 | 8 | 92 | 2.4 | 443 | Present | 2.7 | Comparative Example |
| 12 | −1.2 | −TL × 0.75 | +TU × 0.91 | 61 | 39 | 2.2 | 411 | Present | 6.3 | Comparative Example |
| 13 | −1.2 | −TL × 0.75 | +TU × 0.81 | 77 | 23 | 2.2 | 351 | Not present | 1.8 | Comparative Example |
| 14 | −0.4 | −TL × 0.25 | +TU × 0.46 | 89 | 11 | 2.4 | 321 | Present | 3.1 | Comparative Example |
| 15 | −0.4 | −TL × 0.25 | +TU × 0.51 | 91 | 9 | 1.4 | 319 | Present | 3.8 | Comparative Example |
| 16 | −1.2 | −TL × 0.75 | +TU × 0.88 | 71 | 29 | 3.4 | 391 | Present | 5.4 | Comparative Example |
| 17 | −1.2 | −TL × 0.75 | +TU × 0.89 | 71 | 29 | 3.2 | 388 | Present | 6.1 | Comparative Example |
| 18 | −1.2 | −TL × 0.75 | +TU × 0.91 | 99.5 | 0.5 | 2.9 | 275 | Present | 6.2 | Comparative Example |
| 19 | −1.2 | −TL × 0.75 | +TU × 0.76 | 93 | 7 | 1.6 | 309 | Present | 7.8 | Example |
| 20 | −1.2 | −TL × 0.75 | +TU × 0.90 | 94 | 6 | 1.4 | 287 | Present | 7.3 | Example |
| 21 | −1.2 | −TL × 0.75 | +TU × 0.91 | 92 | 8 | 1.4 | 292 | Present | 10.9 | Example |
| 22 | −1.2 | −TL × 0.75 | +TU × 0.79 | 87 | 13 | 1.6 | 358 | Present | 8.1 | Example |
| 23 | −1.2 | −TL × 0.75 | +TU × 0.95 | 91 | 9 | 1.5 | 321 | Present | 7.8 | Example |
| 24 | −1.2 | −TL × 0.75 | +TU × 0.91 | 90 | 10 | 1.3 | 349 | Present | 8.5 | Example |
| 25 | −0.9 | −TL × 0.75 | +TU × 0.85 | 95 | 5 | 1.5 | 311 | Present | 10.4 | Example |
| 26 | −1.1 | −TL × 0.79 | +TU × 0.87 | 90 | 10 | 1.3 | 334 | Present | 9.4 | Example |
| 27 | −1.3 | −TL × 0.81 | +TU × 0.91 | 92 | 8 | 1.6 | 321 | Present | 11.0 | Example |

As shown in Table 4, in all Examples, the cross tensile strength was 7.0 kN or more, and high joint strength was obtained.

In Comparative Examples, on the other hand, sufficient joint strength was not obtained.

REFERENCE SIGNS LIST 1 steel sheet
2 welded portion
3 annular groove
4 unwelded interface
2-1 recess
2-2 first flow portion
2-3 second flow portion
2-4 welding interface

The invention claimed is:

1. A friction stir spot welded joint comprising:
two or more overlapping steel sheets;
a welded portion of the steel sheets; and
an annular groove on an upper surface of the welded portion,
wherein the welded portion includes a recess, a first flow portion adjacent to the recess, a second flow portion adjacent to the first flow portion, and a welding interface that is a boundary between the first flow portion and the second flow portion,
a deepest point of the recess is located at a distance satisfying at least one of 0.5 mm or more below the lower mating surface of the steel sheets and TL×0.50 or more below the lower mating surface of the steel sheets,
a highest point of the welding interface is located at a distance of TU×0.50 or more above an upper mating surface of the steel sheets,
in the welded portion, a microstructure of a region extending vertically from a distance of TU×0.20 to a distance of TU×0.50 above the upper mating surface of the steel sheets, and extending in a horizontal range from a first point located 400 μm inward from the welding interface to a second point located 100 μm outward from the welding interface, with a center position of the recess as a reference position, has a volume fraction of polygonal ferrite of 70% or more and 99% or less, a volume fraction of hard phase of 1% or more and 30% or less, wherein the hard phase is composed of one or more of martensite and cementite, and an average aspect ratio of the polygonal ferrite of 3.0 or less,
an average hardness of the welded portion at a same vertical position as the upper mating surface of the steel sheets is 400 HV or less, the two or more overlapping steel sheets include an upper sheet and a lower sheet that are respectively a steel sheet located at a top and a steel sheet located at a bottom, TU is a thickness in mm of the upper sheet, TL is a thickness in mm of the lower sheet, the upper mating surface is a mating surface between the upper sheet and a steel sheet adjacent to the upper sheet, and the lower mating surface is a mating surface between the lower sheet and a steel sheet adjacent to the lower sheet.

2. The friction stir spot welded joint according to claim 1, wherein at least one of the steel sheets has a chemical composition containing, in mass %, C: 0.10% or more, Si and Al: 0.5% or more in total, Mn: 1.5% or more, P: 0.10% or less, S: 0.050% or less, and N: 0.010% or less, with a balance consisting of Fe and inevitable impurities.

3. The friction stir spot welded joint according to claim 2, wherein the chemical composition further contains, in mass %, one or more selected from Nb: 0.050% or less, Ti: 0.050% or less, B: 0.0050% or less, V: 0.05% or less, Cr: 0.50% or less, Mo: 0.50% or less, Co: 0.50% or less, Cu: 0.50% or less, Ni: 0.50% or less, Sb: 0.020% or less, and Ca and REM: 0.010% or less in total.

4. The friction stir spot welded joint according to claim 1, wherein at least one of the steel sheets has a tensile strength of 980 MPa or more.

5. The friction stir spot welded joint according to claim 1, wherein at least one of the steel sheets has a coated layer on a surface thereof.

6. The friction stir spot welded joint according to claim 4, wherein at least one of the steel sheets has a coated layer on a surface thereof.

7. The friction stir spot welded joint according to claim 5, wherein the coated layer is a zinc or zinc alloy coated layer.

8. The friction stir spot welded joint according to claim 6, wherein the coated layer is a zinc or zinc alloy coated layer.

9. The friction stir spot welded joint according to claim 2, wherein at least one of the steel sheets has a tensile strength of 980 MPa or more.

10. The friction stir spot welded joint according to claim 3, wherein at least one of the steel sheets has a tensile strength of 980 MPa or more.

11. The friction stir spot welded joint according to claim 2, wherein at least one of the steel sheets has a coated layer on a surface thereof.

12. The friction stir spot welded joint according to claim 3, wherein at least one of the steel sheets has a coated layer on a surface thereof.

13. The friction stir spot welded joint according to claim 9, wherein at least one of the steel sheets has a coated layer on a surface thereof.

14. The friction stir spot welded joint according to claim 10, wherein at least one of the steel sheets has a coated layer on a surface thereof.

15. The friction stir spot welded joint according to claim 11, wherein the coated layer is a zinc or zinc alloy coated layer.

16. The friction stir spot welded joint according to claim 12, wherein the coated layer is a zinc or zinc alloy coated layer.

17. The friction stir spot welded joint according to claim 13, wherein the coated layer is a zinc or zinc alloy coated layer.

18. The friction stir spot welded joint according to claim 14, wherein the coated layer is a zinc or zinc alloy coated layer.

* * * * *